United States Patent Office 3,476,754
Patented Nov. 4, 1969

3,476,754
PYRAZINO[2,3-b]PYRAZINES
Cornelius K. Cain, Flourtown, Pa., assignor to McNeil Laboratories, Incorporated, a corporation of Pennsylvania
No Drawing. Continuation-in-part of applications Ser. No. 541,945, Apr. 12, 1966, and Ser. No. 622,474, Mar. 13, 1967. This application Feb. 20, 1968, Ser. No. 706,804
Int. Cl. C07d 51/82; A61l 23/00; C08k 1/52
U.S. Cl. 260—250                                   11 Claims

ABSTRACT OF THE DISCLOSURE

The compounds are of the class of aryl and heteroaryl pyrazino[2,3-b]pyrazines, having valuable properties as ultraviolet light absorbers.

CROSS REFERENCE

This application is a continuation-in-part of my copending applications, Ser. No. 541,945, filed Apr. 12, 1966, now abandoned, and Ser. No. 622,474, filed Mar. 13, 1967, now abandoned.

SUMMARY OF THE INVENTION

This invention relates to pyrazino[2,3-b]pyrazines having the formula

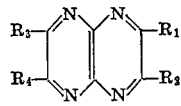

wherein $R_1$, $R_2$ and $R_3$ are members selected from the group consisting of hydrogen, loweralkyl, phenyl, halophenyl, halotolyl, aminophenyl, hydroxyphenyl, acetamidophenyl, loweralkylphenyl, loweralkoxyphenyl, diloweralkoxyphenyl, pyridyl, loweralkylpyridyl, furyl and thienyl; $R_4$ is a member selected from the group consisting of phenyl, halophenyl, halototolyl, aminophenyl, hydroxyphenyl, acetamidophenyl, carboxymethoxyphenyl, sulfinomethylaminophenyl, loweralkylphenyl, loweralkoxyphenyl, diloweralkoxyphenyl, pyridyl, loweralkylpyridyl, nitrophenyl, biphenylyl, furyl and thienyl; and the acid addition salts and loweralkyl quaternary ammonium derivatives of the basic nitrogen containing members.

The term "loweralkyl" includes alkyl groups containing 1 to 7 carbon atoms, and preferably 1 to 4 carbon atoms, including saturated aliphatic chains, straight or branched, such as methyl, ethyl, propyl, isopropyl, n-butyl and isobutyl.

The term "halo" includes chloro, fluoro, and bromo.

$R_1$, $R_2$ and $R_3$ may be the same or different; likewise except for hydrogen and loweralkyl, $R_4$ may be the same as $R_1$, $R_2$ and $R_3$ or different. In certain instances, mixtures of isomers are possible. For example, the following structures are isomeric

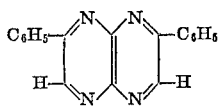

and

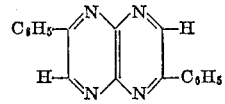

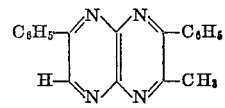

and

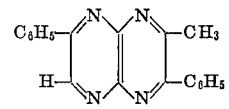

$R_3$ and $R_4$ taken together and in conjunction with the pyrazino ring carbon atoms to which they are attached may constitute certain fused rings, specifically benzo, cyclohexano, acenaphtho, phenanthro and naphtho, having the following structures

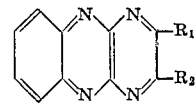

and

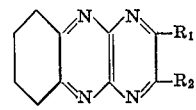

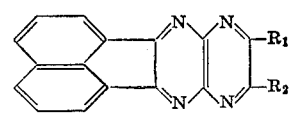

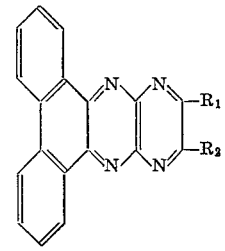

and

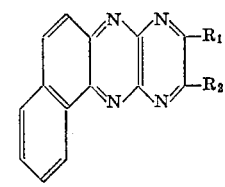

in which $R_1$ and $R_2$ have the same meanings as set forth hereinabove.

The acid addition salts of the basic nitrogen containing compounds are prepared by treatment with an appropriate acid such as an inorganic acid, e.g., hydrochloric, hydrobromic, hydriodic, sulfuric, nitric, or phosphoric; an organic acid such as acetic, propionic, glycolic, lactic, pyruvic, malonic, succinic, maleic, malic, fumaric, tartaric, citric, benzoic, mandelic, cinnamic, methane sulfonic, benzene sulfonic, salicylic, 2-phenoxybenzoic. Conversely, the salt form may be converted in the usual manner into the free base.

The novel basic nitrogen containing compounds may be converted into the corresponding quaternary ammonium compounds by reaction of the tertiary bases with alkylating agents, i.e., alkyl halides such as methyl iodide, ethyl bromide, propyl chloride; lower alkenyl halides—allyl bromide; esters formed by reacting alkanols with an oxygen-containing acid such as dilower alkylsulfates—dimethylsulfate, diethylsulfate; lower alkylarylsulfonates—methyl p-toluenesulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are ethers such as diethylether and tetrahydrofuran, hydrocarbons such as benzene and heptane, ketones such as acetone and butanone, loweralkanols such as ethanol, propanol or butanol; or organic acid amides such as formamide or dimethylformamide. When lower alkyl halogenides are used as quaternizing agents, diethyl ether and benzene are the preferred solvents.

The compounds of this invention absorb ultra violet light and are useful as sun-screening materials in salves and ointments. In addition, because of their solubility in organic materials generally, they may be used as ultra violet absorbers in plastics and resins, such as polystyrene, polyethylene, polypropylene, polyacrylics (methacryllate resins, polyacylamides, polyacrylonitrile fibers), polyamide fibers, (nylon, e.g.) and polyester fibers. In the latter use, the inclusion of 0.01 to 5 percent of the absorber, based on the polymer weight, is sufficient to render protection against ultra violet light, such as in plastic film or light filters. The absorber may be incorporated in the mixtures of monomers before polymerization to form the polymer or it may be incorporated in the polymer at any stage during its handling, as by milling into the polymer together with other compounding ingredients or during the spinning of polymers into fibers, etc.

The compounds of this invention may be prepared by reacting the appropriate 2,3-diamino pyrazine, the appropriate 2,3 - diamino-5-substituted pyrazine or the appropriate 2,3-diamino - 5,6 - disubstituted pyrazine with the appropriate 1,2-dicarbonyl compound such as glyoxal, benzil, 2,2′-pyridyl, 3,3′-pyridyl, 4,4′-pyridyl, phenylglyoxal and p,p′-dimethoxybenzil, for example by refluxing the reactants together in a suitable solvent such as ethanol, or in some cases by heating the reactants together.

The appropriate 2,3-diamino pyrazine used in preparing the novel compounds of this invention may be prepared by reacting the appropriate 1,2-dicarbonyl compound, such as glyoxal, benzil, phenylmethylglyoxal and 2,2-pyridil, with aminomalonamide to form the corresponding 3-hydroxypyrazinecarboxamide, which is converted successively by known methods to the corresponding aminohydroxypyrazine and thence to the aminochloropyrazine and finally to the 2,3-diaminopyrazine.

Illustrative of the novel compounds of this invention which may be prepared by the methods set forth hereinabove are the following:

2,3,6,7-tetraphenylpyrazino[2,3-b]pyrazine
2,3,6-triphenylpyrazino[2,3-b]pyrazine
2,7-diphenylpyrazino[2,3-b]pyrazine
2,6-diphenylpyrazino[2,3-b]pyrazine
2-methyl-3,6,7-triphenylpyrazino[2,3-b]pyrazine
2,7-dimethyl-3,6-diphenylpyrazino[2,3-b]pyrazine
2,6-dimethyl-3,7-diphenylpyrazino[2,3-b]pyrazine
2-methyl-6-phenylpyrazino[2,3-b]pyrazine
2-methyl-7-phenylpyrazino[2,3-b]pyrazine
2,3-dimethyl-6,7-di-m-tolylpyrazino[2,3-b]pyrazine
2,3-dimethyl-6-phenyl-7-m-tolylpyrazino[2,3-b]pyrazine
2,3-dimethyl-6,7-di-o-tolylpyrazino[2,3-b]pyrazine
2,3-dimethyl-6-phenyl-7-o-tolylpyrazino[2,3-b]pyrazine
2-m-chlorophenyl-6,7-dimethyl-3-phenylpyrazino[2,3-b]pyrazine
2,3-dimethyl-6,7-di-p-trifluoromethylphenylpyrazino[2,3-b]pyrazine
2-methyl-6,7-diphenylpyrazino[2,3-b]pyrazine
2,3-di-o-chlorophenyl-6,7-dimethylpyrazino[2,3-b]pyrazine
2-o-chlorophenyl-6,7-dimethyl-3-phenylpyrazino[2,3-b]pyrazine
2,3-di-p-fluorophenyl-6,7-dimethylpyrazino[2,3-b]pyrazine
2,3-di-m-fluorophenyl-6,7-dimethylpyrazino[2,3-b]pyrazine
2-m-fluorophenyl-6,7-dimethyl-3-phenylpyrazino[2,3-b]pyrazine
2,3-dimethyl-6-phenyl-7-m-trifluoromethylphenylpyrazino[2,3-b]pyrazine
2,3-dimethyl-6-p-sulfinomethylaminophenyl-7-phenylpyrazino[2,3-b]pyrazine The following examples are intended to illustrate, but not to limit, the scope of the present invention.

EXAMPLE I

A mixture of 10.0 g. (0.073 mole) of 2,3-diamino-5,6-dimethylpyrazine and 15.4 g. (0.073 mole) of 3,3′-pyridil in 200 ml. of absolute ethanol is refluxed for 3 hours. The solvent is evaporated and the residue is dissolved in warm water. Chilling and scratching results in the separation of crystals which are recrystallized from water. The resulting yellow crystals are dried to give 2,3-dimethyl-6,7 - di(3 - pyridyl)pyrazino[2,3 - b]pyrazine, M.P. 188–190° C.

EXAMPLE II

A mixture of 1.0 g. (0.0073 mole) of 2,3-diamino-5,6-dimethylpyrazine and 1.54 g. (0.0073 mole) of 2,2′-pyridil in 20 ml. of absolute ethanol is refluxed for 6 hrs. The mixture is chilled and filtered to give a solid which is recrystallized from 95% ethanol to give 2,3-dimethyl-6,7-di-(2-pyridyl)pyrazino[2,3-b]pyrazine, orange yellow crystals, M.P. 269–270° C.

EXAMPLE III

A mixture of 10 g. (0.073 mole) of 2,3-diamino-5,6-dimethylpyrazine and 15.2 g. (0.073 mole) of benzil in 160 ml. of absolute ethanol is refluxed for 6 hrs. The hot solution is treated with decolorizing charcoal, if indicated, filtered and cooled. The orange-yellow crystals which separate are recrystallized from ethanol to give 2,3-dimethyl-6,7-diphenylpyrazino[2,3-b]pyrazine, M.P. 228–230° C.

EXAMPLE IV

Using the procedure of Example III, except that an equivalent quantity of phenylglyoxal hydrate is substituted for benzil, orange crystals of 2,3-dimethyl-6-phenylpyrazino[2,3-b]pyrazine are obtained, M.P. 209–210° C.

EXAMPLE V

Using the procedure of Example III, except that an equivalent quantity of p,p′-dichlorobenzil is used in place of benzil, yellow crystals of 2,3-bis(p-chlorophenyl)-6,7-dimethylpyrazine[2,3-b]pyrazine are obtained, M.P. 246–249° C.

EXAMPLE VI

An intimate mixture of 6.0 g. (0.022 mole) of p,p′-dimethoxybenzil and 4.1 g. (0.030 mole) of 2,3-diamino-5,6-dimethylpyrazine is heated at 180–195° C. for one hour, cooled and dissolved in ethyl acetate. The solution is washed with dilute hydrochloric acid, dried with sodium sulfate, treated with decolorizing charcoal and filtered. Evaporation of the solvent gives a solid which is crystallized from 95% ethanol to yield yellow-orange crystals of 2,3-bis(p-methoxyphenyl)-6,7-dimethylpyrazino[2,3-b]pyrazine, M.P. 206–207° C.

EXAMPLE VII

Using the procedure of Example III, except that an equivalent quantity of p-tolil is substituted for benzil, yellow-orange crystals of 2,3-dimethyl-6,7-di-p-tolylpyrazino[2,3-b]pyrazine are obtained, M.P. 198–200° C.

EXAMPLE VIII

Using the procedure of Example III, except that an equivalent quantity of m,m'-dichlorobenzil is used in place of benzil, yellow crystals of 2,3-bis(m-chlorophenyl)-6,7-dimethylpyrazino[2,3-b]pyrazine are obtained, M.P. 205–207° C.

EXAMPLE IX

Using the method of Example III, and substituting an equivalent quantity of p-methylbenzil for benzil and recrystallizing the product from isopropyl alcohol instead of from ethanol yellow crystals of 2,3-dimethyl-6-phenyl-7-p-tolylpyrazino[2,3-b]pyrazine are obtained, M.P. 204–206° C.

EXAMPLE X

Using the procedure of Example II and replacing 2,2'-pyridil with an equivalent quantity of 4,4'-dipyridil, the product obtained is 2,3-dimethyl-6,7-di(4-pyridyl)pyrazino[2,3-b]pyrazine.

EXAMPLE XI

Using the procedure of Example II and replacing 2,2'-pyridil with equivalent quantities respectively of 2,2'-(6,6'-dimethyl)pyridil, 3,3' - (5,5' - dipropyl)pyridil the corresponding 6,7-di(loweralkylpyridyl) compounds are obtained, namely, 2,3-dimethyl - 6,7 - di(6-methyl-2-pyridyl) pyrazino[2,3-b]pyrazine and 2,3-dimethyl-6,7-di(5-propyl-3-pyridyl)pyrazino[2,3-b]pyrazine.

EXAMPLE XII

Using the procedure of Example VI, and substituting p-methoxybenzil for p,p'-dimethoxybenzil and purifying the product by chromatography on alumina followed by recrystallization from benzene - cyclohexane instead of from 95% ethanol, the product obtained is 6-p-methoxyphenyl-2,3-dimethyl - 7 - phenylpyrazino[2,3 - b]pyrazine, M.P. 140–142° C.

EXAMPLE XIII

A mixture of 0.6 g. (0.0023 mole) of 2,3-diamino-5,6-diphenylpyrazine and 0.45 ml. (0.0023 mole) of 30% aqueous glyoxal in 10 ml. of absolute ethanol is refluxed for 3 hrs. The mixture is diluted with ethyl acetate and washed successively with dilute hydrochloric acid, dilute sodium hydroxide and water and dried with sodium sulfate. Evaporation of the solvent gives a glass which is purified by chromatography on alumina followed by recrystallization from 95% ethanol to yield 2,3-diphenylpyrazino[2,3-b]pyrazine, M.P. 170–173° C.

EXAMPLE XIV

Using the procedure of Example III and substituting an equivalent quantity of acenaphthenequinone for benzil the product obtained is 9,10-dimethylacenaphtho[1,2-b]pyrazino[2,3-b]pyrazine, M.P. 352–355° C.

EXAMPLE XV

To a solution of 3.3 grams (0.01 mole) of 2,3-dimethyl-6 - (p-hydroxyphenyl)-7-phenylpyrazino[2,3-b]pyrazine in 100 ml. of anhydrous acetone are added 20 grams of anhydrous potassium carbonate and 2.0 grams (0.012 mole) of ethyl bromoacetate. The mixture is stirred and refluxed for 24 hours. The mixture is filtered and the acetone solution is evaporated to dryness. The residue, which consists of impure ethyl ester of 2,3-dimethyl-6-(p-carboxymethoxyphenyl)-7-phenylpyrazino[2,3-b]pyrazine, is dissolved in 100 ml. of 50% aqueous ethanol. Sodium hydroxide (0.48 gram, 0.012 mole) is added and the solution is refluxed and stirred until the hydrolysis of the ester group is essentially complete as shown by no appreciable change in the pH of the solution with time. Evaporation of the solvent gives an amorphous solid product, which is the impure sodium salt of 2,3-dimethyl-6-(p-carboxymethoxyphenyl)-7-phenylpyrazino[2,3-b]pyrazine. This product is shaken with 50 ml. of aqueous sodium bicarbonate and 50 ml. of ethyl acetate and the layers separated. Acidification of the aqueous layer with mineral acid results in the formation of a precipitate which is collected and dried to give 2,3-dimethyl-6-(p-carboxymethoxyphenyl)-7-phenylpyrazino[2,3-b]pyrazine; M.P. 236–238° C.

EXAMPLE XVI

Using the procedure of Example XIII and substituting an equivalent quantity of 1,2-cyclohexanedione for glyoxal, the product obtained is 2,3-diphenylcyclohexano[b]pyrazino[2,3-b]pyrazine; M.P. 184–185° C.

EXAMPLE XVII

A mixture of 4.6 grams (0.019 mole) of 3-chlorobenzil and 2.9 grams (0.021 mole) of 2,3-diamino-5,6-dimethylpyrazine is refluxed and stirred in absolute ethanol (40 ml.) for 7 hours. The reaction solution is cooled to room temperature and chilled briefly. The mixture is filtered. On recrystallization from isopropyl alcohol, the product obtained is 2-m-chlorophenyl-6,7-dimethyl - 3 - phenylpyrazino[2,3-b]pyrazine, M.P. 197–198° C.

EXAMPLE XVIII

A mixture of 6.3 grams (0.030 mole) of phenanthrenequinone and 5.0 grams (0.036 mole) of 2,3-diamino-5,6-dimethylpyrazine is refluxed in 170 ml. of absolute ethanol for 7 hours. The reaction mixture is chilled briefly and filtered. The product is taken up in chloroform and washed twice with 50 ml. portions of 10 percent sodium bisulfite solution and then twice with water. Emulsions encountered in these extractions are filtered. The chloroform solution is decolorized, dried and evaporated. On recrystallization from chloroform-95 percent ethanol, the product obtained is 11,12-dimethylphenanthro[9,10-b]pyrazino[2,3-b]pyrazine, M.P. 260–263° C.

EXAMPLE XIX

A mixture of 3.4 ml. (0.014 mole) of 30 percent aqueous pyruvic aldehyde and 4.0 grams (0.015 mole) of 2,3-diamino-5,6-diphenylpyrazine is refluxed and stirred in absolute ethanol (40 ml.) for 1 hour. The reaction mixture is chilled and filtered. The filtrate is concentrated to a small volume, diluted with ethyl acetate and washed successively with dilute hydrochloric acid, dilute sodium hydroxide, and water. The ethyl acetate solution is dried over sodium sulfate, decolorized with carbon black and evaporated. The filtered solid and the material from the filtrate are combined and purified by eluting from a column of Baker neutral alumina with ethyl acetate:benzene (2:8). An initial fraction affords a small amount of unidentified, waxy solid; the following fraction contains the desired product, and a third fraction yields a small amount of unidentified purple glass.

The product is recrystallized with activated charcoal treatment from 95 percent ethanol. The product is 2-methyl-6,7-diphenylpyrazino[2,3-b]pyrazine, M.P. 192–193° C.

EXAMPLE XX

A mixture of 1.6 grams (0.014 mole) of hexane-3,4-dione and 3.0 grams (0.0115 mole) of 2,3-diamino-5,6-diphenylpyrazine is refluxed and stirred in absolute ethanol (25 ml.) for 6½ hours. The reaction mixture is chilled and filtered. The filtrate is chromatographed on a column of Baker neutral alumina. Elution is accomplished with ethyl acetate:benzene (2.8). On recrystallization from 95 percent ethanol, the product obtained is 2,3-diethyl-6,7-diphenylpyrazino[2,3-b]pyrazine, M.P. 217–218° C.

EXAMPLE XXI

A mixture of 2.6 grams (0.014 mole) of furil and 2.4 grams (0.017 mole) of 2,3-diamino-5,6-dimethylpyrazine is refluxed and stirred in absolute ethanol (35 ml.) for 16 hours. The reaction mixture is chilled and filtered.

On recrystallization, with charcoal treatment, twice from isopropyl alcohol, the product obtained is 2,3-di-2'-furyl-6,7-dimethylpyrazino[2,3-b]pyrazine, M.P. 153–158° C.

EXAMPLE XXII 5.1 grams (0.036 mole) of 2,3-diamino-5,6-dimethylpyrazine and 6.9 grams (0.029 mole) of 2,2'-dimethylbenzil are ground together and fused in a steel autoclave at 210° C. for 1½ hours. After allowing to cool overnight, the bomb is opened and the contents are taken up in hot ethyl acetate. The black solid is filtered off, after treating with activated charcoal, and discarded. The filtrate is washed with 5 percent hydrochloric acid and the acid solution is backwashed with ethyl acetate. Extracts and washings are treated with activated charcoal and dried over anhydrous magnesium sulfate. The solution is concentrated in vacuo. The product is recrystallized from ethanol-heptane and recrystallized from benzene. The product is 2,3-dimethyl-6,7-di-o-tolylpyrazino[2,3-b]pyrazine, M.P. 245–246° C.

EXAMPLE XXIII

A solution of 4.8 grams (0.035 mole) of 2,3-diamino-5,6-dimethylpyrazine and 7.1 grams (0.03 mole) of m-tolil in 100 ml. of ethanol is refluxed for 23 hours. The reaction mixture is treated with activated charcoal and filtered. The filtrate is concentrated to about 75 ml. and cooled. The crude product is recrystallized from ethanol-heptane. The product is 2,3-dimethyl-6,7-di-m-tolylpyrazino[2,3-b]pyrazine, M.P. 168–169° C.

EXAMPLE XXIV

A mixture of 5.4 grams (0.036 mole) of methylphenylglyoxal and 7.5 grams (0.029 mole) of 2,3-diamino-5,6-diphenylpyrazine is refluxed and stirred in absolute ethanol (70 ml.) for 7 hours. The reaction mixture is chilled briefly and filtered. On recrystallization from 95 percent ethanol-chloroform with slow cooling, the product is 2-methyl - 3,6,7 - triphenylpyrazino[2,3-b]pyrazine, M.P. 220–221° C.

EXAMPLE XXV

A mixture of 6.4 grams (0.043 mole) of methylphenylglyoxal and 6.0 grams (0.043 mole) of 2,3-diamino-5,6-dimethylpyrazine is refluxed and stirred in absolute ethanol (75 ml.) for 6 hours. The reaction mixture is chilled and filtered. The filtrate is evaporated and the oily residue obtained is dissolved in ethyl acetate. The solution is washed twice with dilute hydrochloric acid, twice with water, dried over sodium sulfate, decolorized and evaporated. On recrystallization from benzene-cyclohexane, the product obtained is 2,3,6-trimethyl-7-phenylpyrazino[2,3-b]pyrazine, M.P. 125–126° C.

EXAMPLE XXVI

A solution of 1.9 grams (0.0065 mole) of 4-methyl-4'-trifluoromethylbenzil and 1 gram (0.0073 mole) of 2,3-diamino-5,6-dimethylpyrazine in 20 ml. of ethanol is refluxed for 6 hours. The reaction mixture is heated and treated with activated charcoal. The filtrate is allowed to cool overnight. After two recrystallizations from isopropanol the product obtained is 2,3-dimethyl-6-p-tolyl-7-($\alpha,\alpha,\alpha$-trifluoro - p -tolyl)pyrazino[2,3-b]pyrazine, M.P. 202–204° C.

EXAMPLE XXVII

A solution of 2.25 grams (0.0065 mole) of 4,4'-bis-trifluoromethylbenzil and 1 gram (0.0073 mole) of 2,3-diamino-5,6-dimethylpyrazine in 25 ml. of ethanol is refluxed for 1 hour, treated with activated charcoal and the filtrate is cooled. On recrystallization from isopropanol, the product obtained is 2,3-bis($\alpha,\alpha,\alpha$-trifluoro-p-tolyl)-6,7-dimethylpyrazino[2,3-b]pyrazine, M.P. 237–238° C.

EXAMPLE XXVIII

A mixture of 4.0 grams (0.022 mole) of p-methoxyphenylglyoxal hydrate and 3.1 grams (0.023 mole) of 2,3-diamino-5,6-dimethylpyrazine is refluxed in absolute ethanol (45 ml.) for 6 hours. The reaction mixture is chilled and filtered. On recrystallization from isopropanol-chloroform in the presence of activated charcoal the product obtained is 2,3-dimethyl-6-(p-methoxyphenyl)pyrazino[2,3-b]pyrazine, M.P. 208–210° C.

EXAMPLE XXIX

A mixture of 4.9 grams (0.022 mole) of p-hydroxybenzil and 3.3 grams (0.024 mole) of 2,3-diamino-5,6-dimethylpyrazine is refluxed in absolute ethanol (50 ml.) for 24 hours. The reaction mixture is chilled and filtered. On recrystallization from 95 percent ethanol-chloroform in the presence of activated charcoal the product obtained is 2,3 - dimethyl - 6 - (p - hydroxyphenyl - 7 - phenylpyrazino[2,3-b]pyrazine, M.P. 309–311° C.

EXAMPLE XXX

A mixture of 3.5 grams (0.015 mole) of p-methoxybenzfuril and 2.3 grams (0.017 mole) of 2,3-diamino-5,6-dimethylpyrazine is refluxed in absolute ethanol (20 ml.) for 7 hours. The reaction solution is chilled but no crystallization takes place. On warming to room temperature a solid deposits. The mixture is then chilled and filtered. Recrystallization from isopropyl alcohol in the presence of activated charcoal gives yellow-orange crystals, M.P. 164–167° C. The product is chromotographed on a column of Baker neutral alumina. Elution is effected with ethyl acetate:benzene (1:1). The product obtained is 2,3-dimethyl - 6 - (2 - furyl) - 7 - (p - methoxyphenyl)pyrazino[2,3-b]pyrazine, M.P. 165–167° C.

EXAMPLE XXXI

A mixture of 6.4 grams (0.029 mole) of 2,2'-thenil and 5.0 grams (0.036 mole) of 2,3-diamino-5,6-dimethylpyrazine is heated in an oil bath at 190–200° C. for 1½ hours. The reaction product is taken up in ethyl acetate and washed with dilute hydrochloric acid and then with water. The ethyl acetate solution is dried over sodium sulfate, decolorized with activated charcoal and evaporated. The product is recrystallized from isopropyl alcohol with decolorization (activated charcoal). The product is 2,3 - dimethyl - 6,7 - di - 2 - thienylpyrazino[2,3-b]pyrazine, M.P. 190–191° C.

EXAMPLE XXXII

A mixture of 2.84 grams (0.013 mole) of p-biphenylglyoxal hydrate and 2.0 grams (0.015 mole) of 2,3-diamino-5,6-dimethylpyrazine is refluxed and stirred in absolute ethanol (40 ml.) for 4 hours. The reaction mixture is chilled briefly and filtered. On recrystallization from 95 percent ethanol with activated charcoal treatment the product obtained is 2-p-biphenylyl-6,7-dimethylpyrazino[2,3-b]pyrazine, M.P. 205–206° C.

EXAMPLE XXXIII

A mixture of 11 grams (0.043 mole) of p-nitrobenzil (prepared by the method of E. B. Womack, N. Campbell and G. B. Dodds, J. Chem. Soc., 1402 (1938)) and 7.6 grams (0.055 mole) of 2,3-diamino-5,6-dimethylpyrazine is refluxed and stirred in absolute ethanol (150 ml.) for 4 hours. The reaction solution deposits an oil on cooling. The mixture is scratched and chilled, and then filtered. On recrystallization the product obtained is 2,3-dimethyl-6 - p - nitrophenyl - 7 - phenylpyrazino[2,3-b]pyrazine, M.P. 180–181° C.

EXAMPLE XXXIV

A stirred mixture of 5.5 grams (0.030 mole) of tolylglyoxal hydrate and 5.0 grams (0.036 mole) of 2,3-diamino-5,6-dimethylpyrazine is refluxed in absolute ethanol (70 ml.) for 4 hours. The reaction mixture is cooled and filtered. The solid material is recrystallized from 95 percent ethanol with activated charcoal treatment. The product obtained is 2,3-dimethyl-6-p-tolylpyrazino[2,3-b]pyrazine, M.P. 198–200° C.

EXAMPLE XXXV

A stirred mixture of 5.1 grams (0.027 mole) of m-chlorophenylglyoxal hydrate and 4.0 grams (0.029 mole) of 2,3-diamino-5,6-dimethylpyrazine is refluxed in absolute ethanol (55 ml.) for 6 hours. The reaction mixture is chilled and filtered. The solid material is recrystallized from 95 percent ethanol with activated charcoal treatment. The product obtained is 2-m-chlorophenyl-5,6-dimethylpyrazine[2,3-b]pyrazine, M.P. 230–231° C.

EXAMPLE XXXVI

A solution of 1.6 grams (0.01 mole) of 2,3-diaminoquinoxaline and 0.9 gram (0.01 mole) of biacetyl in 20 ml. of absolute ethanol is refluxed for 1 hour. The mixture is cooled and the resulting solid is filtered off. The solid material is dissolved in hot absolute ethanol and the solution is filtered while hot. The product is then recrystallized from the ethanol. An ethanol solution of the product is passed through a chromatograph tower containing acid washed alumina, using benzene:chloroform (50:50) to elute the product. The product is then recrystallized from chloroform-ether. The product is 2,3-dimethylpyrazino[2,3-b]quinoxaline, darkens at 190° C.

EXAMPLE XXXVII

A mixture of 1 gram (0.005 mole) of 2,3-diamino-5-methyl-6-phenylpyrazine and 1.5 grams (0.01 mole) of methylphenyl glyoxal is fused at 120° C. in an open test tube for 2 hours. The reaction product is dissolved in 40 ml. of ethyl acetate, treated with activated charcoal, and the filtrate is cooled overnight. The product is filtered and washed with ethyl acetate and ether. The product is 2,7-dimethyl-3,6-diphenylpyrazino[2,3-b]pyrazine, M.P. 233–234° C.

EXAMPLE XXXVIII

A vigorously stirred mixture of 21 grams (0.38 mole) of powdered iron and 50 percent acetic acid (50 ml.) is warmed on a steam bath. After several minutes 8.5 grams (0.024 mole) of 2,3-dimethyl-6-(p-nitrophenyl)-7-phenylpyrazino[2,3-b]pyrazine is added portionwise, followed by the addition of more 50 percent acetic acid (50 ml.). The reaction mixture is stirred and then is heated on a steam bath for 2½ hours. The mixture is cooled to room temperature and made slightly basic with saturated sodium bicarbonate solution, and then extracted several times with chloroform. The combined chloroform extracts are washed with water, dried over sodium sulfate, and evaporated. On recrystallization from 95 percent ethanol the product obtained is 2-(p-aminophenyl)-6,7-dimethyl-3-phenylpyrazino[2,3-b]pyrazine, M.P. 280–282° C.

EXAMPLE XXXIX

A mixture of 8.8 grams (0.034 mole) of 3-chloro-4'-methylbenzil and 4.0 grams (0.029 mole) of 2,3-diamino-5,6-dimethylpyrazine is refluxed in absolute ethanol (60 ml.) for 5 hours. The reaction solution is scratched and cooled to induce crystallization. The crystals are recrystallized from isopropanol. The product obtained is 2-(m-chlorophenyl-6,7-dimethyl-3-(p-tolyl)pyrazino[3,4-b]pyrazine, M.P. 181–184° C.

EXAMPLE XL

A mixture of 1.85 (0.0092 mole) of benzfuril and 1.35 grams of 0.0098 mole) of 2,3-diamino-5,6-dimethylpyrazine is refluxed in absolute ethanol (20 ml.) for 6 hours. The reaction solution is chilled and filtered. On recrystallization from isopropanol with activated charcoal treatment, the product obtained is 2,3-dimethyl-6-(2-furyl)-7-phenylpyrazino[2,3-b]pyrazine, M.P. 139–141° C.

EXAMPLE XLI

A solution of 1.5 grams (0.0045 mole) of 2-(p-aminophenyl)-6,7-dimethyl-3-phenylpyrazino[2,3-b]pyrazine in acetic anhydride (15 ml.) is refluxed for 3½ hours. The reaction solution is poured into an ice and water mixture (ca. 200 ml.), and the water mixture is extracted with ethyl acetate. The ethyl acetate layer is washed successively with 5 percent hydrochloric acid, 10 percent sodium bicarbonate, and water, dried over sodium sulfate and evaporated. The product is chromatographed on a column of Merck acid washed alumina. The column is made in ethyl acetate containing a trace of concentrated hydrochloric acid and the product is placed on the column in a 2:1 mixture of chloroform:ethyl acetate containing a trace of concentrated hydrochloric acid. The elution is effected with ethyl acetate-chloroform. This eluate is recrystallized from isopropyl-alcohol. The product obtained is 2,3-dimethyl-6-(p-acetamidophenyl)-7-phenylpyrazino[2,3-b]pyrazine, M.P. 261–262° C.

Table I shows the ultraviolet light absorption characteristics of the compounds identified in the examples. The solvent employed is methanol.

TABLE I

| Example Number | $\lambda_{max}$ (m$\mu$) | $\epsilon$ | Example Number | $\lambda_{max}$ (m$\mu$) | $\epsilon$ |
|---|---|---|---|---|---|
| I | 223 | 32,600 | XXII | 240 | 14,540 |
|  | 260 | 11,300 |  | 260 | 7,470 |
|  | 354 | 23,600 |  | 353 | 18,670 |
| II | 222 | 26,300 | XXIII | 228 | 3,300 |
|  | 250 | 13,700 |  | 270 | 10,420 |
|  | 350 | 22,400 |  | 367 | 21,150 |
| III | 226 | 29,400 | XXIV | 234 | 34,600 |
|  | 262 | 9,450 |  | 270 | 12,400 |
|  | 363 | 21,500 |  | 377 | 26,500 |
| IV | 235 | 14,000 | XXV | 228 | 15,300 |
|  | 253 | 14,200 |  | 290 | 3,200 |
|  | 352 | 22,800 |  | 339 | 22,400 |
| V | 237 | 32,200 | XXVI | 226 | 32,300 |
|  | 277 | 12,800 |  | 276 | 10,940 |
|  | 365 | 22,600 |  | 364 | 21,150 |
| VI | 228 | 19,500 | XXVII | 227 | 37,150 |
|  | 255 | 28,000 |  | 266 | 10,400 |
|  | 287 | 13,600 |  | 254 | 24,400 |
|  | 398 | 18,800 | XXVIII | 268 | 19,000 |
| VII | 241 | 29,000 |  | 277 | 22,300 |
|  | 277 | 11,200 | XXIX | 228 | 25,000 |
|  | 376 | 21,000 |  | 240 | 21,800 |
| VIII | 230 | 33,200 |  | 286 | 12,500 |
|  | 260 | 9,600 |  | 388 | 17,000 |
|  | 358 | 22,000 | XXX | 260 | 24,600 |
| IX | 225 | 30,900 |  | 290 | 12,700 |
|  | 270 | 10,300 |  | 402 | 19,500 |
|  | 366 | 20,600 | XXXI | 238 | 17,900 |
| XII | 228 | 28,200 |  | 265 | 18,100 |
|  | 241 | 25,100 |  | 409 | 17,900 |
|  | 283 | 13,800 | XXXII | 274 | 24,800 |
|  | 382 | 19,600 |  | 367 | 30,000 |
| XIII | 226 | 26,500 | XXXIII | 250 | 18,100 |
|  | 258 | 9,000 |  | 292 | 12,000 |
|  | 363 | 16,700 |  | 362 | 25,100 |
| XIV | 232 | 53,300 | XXXIV | 240 | 12,100 |
|  | 313 | 30,800 |  | 259 | 17,000 |
|  | 326 | 44,700 |  | 361 | 2,370 |
|  | 358 | 18,400 | XXXV | 235 | 13,400 |
|  | 372 | 17,400 |  | 255 | 13,400 |
| XV | 227 | 26,100 |  | 248 | 26,800 |
|  | 240 | 23,200 | XXXVI | 231 | 27,200 |
|  | 283 | 13,200 |  | 254 | 32,200 |
|  | 382 | 18,000 |  | 356 | 18,800 |
| XVI | 227 | 31,200 |  | 373 | 25,800 |
|  | 263 | 9,550 | XXXVII | 233 | 18,400 |
|  | 370 | 23,400 |  | 253 | 12,850 |
| XVII | 226 | 35,500 |  | 355 | 26,300 |
|  | 260 | 10,500 | XXXVIII | 233 | 21,900 |
|  | 361 | 22,800 |  | 317 | 17,600 |
| XVIII | 246 | 75,000 |  | 425 | 12,800 |
|  | 290 | 7,960 | XXXIX | 230 | 30,700 |
|  | 303 | 14,200 |  | 273 | 10,800 |
|  | 315 | 22,700 |  | 367 | 21,000 |
|  | 402 | 25,400 | XL | 240 | 22,100 |
| XIX | 227 | 29,200 |  | 284 | 11,700 |
|  | 260 | 9,500 |  | 388 | 19,700 |
|  | 364 | 19,700 | XLI | 235 | 24,000 |
| XX | 226 | 32,800 |  | 247 | 25,800 |
|  | 261 | 10,100 |  | 287 | 15,600 |
|  | 364 | 23,000 |  | 379 | 20,400 |
| XXI | 263 | 24,300 |  |  |  |
|  | 300 | 10,300 |  |  |  |
|  | 325 | 8,100 |  |  |  |
|  | 409 | 16,600 |  |  |  |

I claim:
1. A member selected from the group of pyrazino[2,3-b] pyrazines having the formula

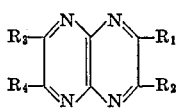

wherein $R_1$, $R_2$ and $R_3$ are members selected from the group consisting of hydrogen, loweralkyl, phenyl, halophenyl, trifluoromethylphenyl, aminophenyl, hydroxyphenyl, acetamidophenyl, loweralkylphenyl, loweralkoxyphenyl, diloweralkoxyphenyl, pyridyl, loweralkylpyridyl, furyl and thienyl; and $R_4$ is a member selected from the group consisting of phenyl, halophenyl, trifluoromethylphenyl, aminophenyl, hydroxyphenyl, acetamidophenyl, carboxymethoxyphenyl, loweralkylphenyl, loweralkoxyphenyl, diloweralkoxyphenyl, pyridyl loweralkylpyridyl, nitrophenyl, biphenylyl, furyl, and thienyl; and the acid addition salts and loweralkyl quaternary ammonium derivatives of the basic nitrogen containing members.

2. A member selected from a group of pyrazino-[2,3-b]pyrazines having a formula selected from the group consisting of

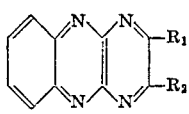

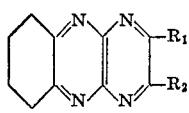

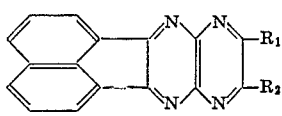

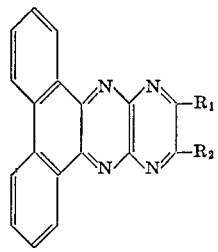

and

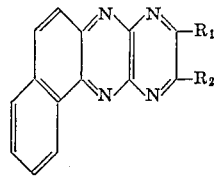

wherein $R_1$ and $R_2$ are members selected from the group consisting of hydrogen, loweralkyl, phenyl, halophenyl, loweralkylphenyl, pyridyl and loweralkylpyridyl; and the acid addition salts and loweralkyl quaternary ammonium derivatives of the basic nitrogen containing members.

3. 2,3-dimethyl-6,7-diphenylpyrazino[2,3-b]pyrazine.
4. 2,3-dimethyl-6-phenylpyrazino[2,3-b]pyrazine.
5. 2,3-dimethyl-6,7-di-p-tolylpyrazino[2,3-b]pyrazine.
6. 2,3-dimethyl - 6 - phenyl-7-p-tolylpyrazino[2,3-b] pyrazine.
7. 2,3 - diphenylcyclohexano[b]pyrazino[2,3 - b]pyrazine.
8. 11,12 - dimethylphenanthro[9,10 - b]pyrazino[2,3-b]pyrazine.
9. 2,3 - di - 2'-furyl-6,7-dimethylpyrazino[2,3-b]pyrazine.
10. 2,3 - dimethyl - 6 - (p-methoxyphenyl)pyrazino-[2,3-b]pyrazine.
11. 2,3-dimethyl-6-p-tolylpyrazino[2,3-b]pyrazine.

References Cited

UNITED STATES PATENTS 2,345,236  3/1944  Chitwood et al. ____ 260—268
2,345,237  3/1944  Chitwood et al. ____ 260—268

NICHOLAS S. RIZZO, Primary Examiner

U.S. Cl. X.R.

260—45.8; 424—59

PO-1050
(5/69)

UNITED STATES PATENT OFFICE
CERTIFICATE OF CORRECTION

Patent No. 3,476,754      Dated November 4, 1969

Inventor(s) Cornelius K. Cain

It is certified that error appears in the above-identified patent and that said Letters Patent are hereby corrected as shown below:

Column 6, line 67, "(2.8)" should read --(2:8)--. Column 8, line 18, an end of parenthesis should appear after the word "hydroxyphenyl' Same column, line 72, the number "0.030" should read --0.033--. In column 9, line 14, the word "dimethylpyrazine" should read --dimethylpyrazino--. Same column, line 72, a beginning of parenthesis should appear after the word "of", first occurrence. In Table I, Example XXXI, the number "18,100", under € should read --18,200--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents